June 23, 1953     C. M. BURNS     2,642,695
ARTIFICIAL FISHING LURE
Filed March 3, 1950     2 Sheets-Sheet 1
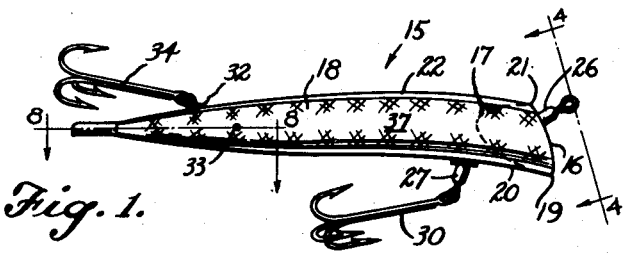
Fig. 1.
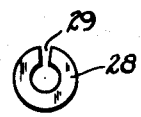
Fig. 7.
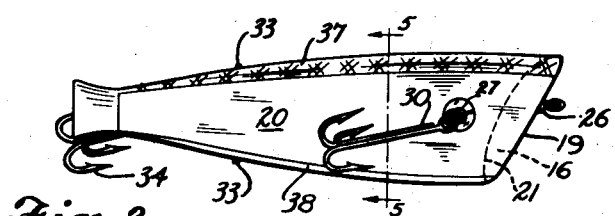
Fig. 2.
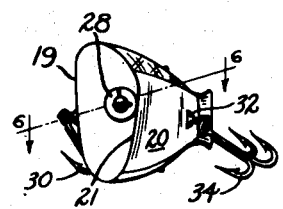
Fig. 4.
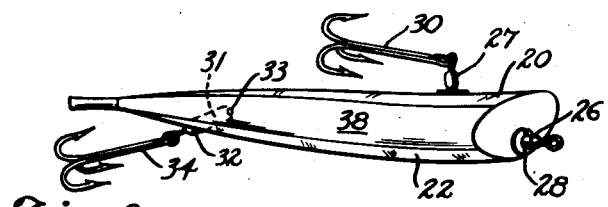
Fig. 3.
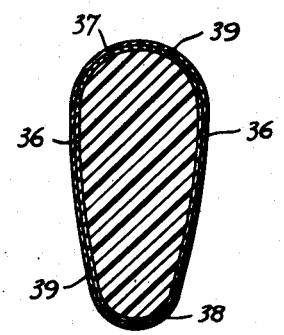
Fig. 6.
Fig. 5.
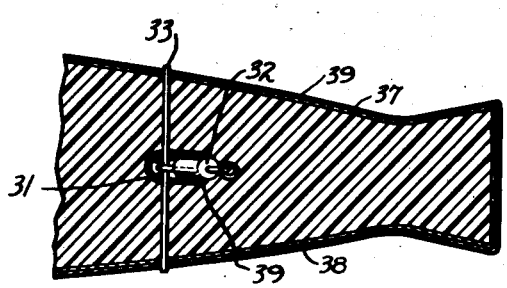
Fig. 8.
INVENTOR.
CLIFFORD M. BURNS
BY
Arnold and Mathis
ATTORNEYS

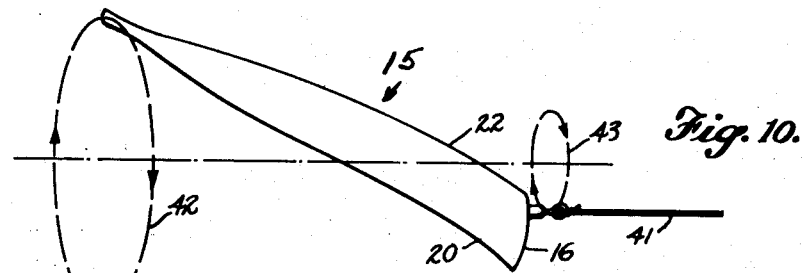
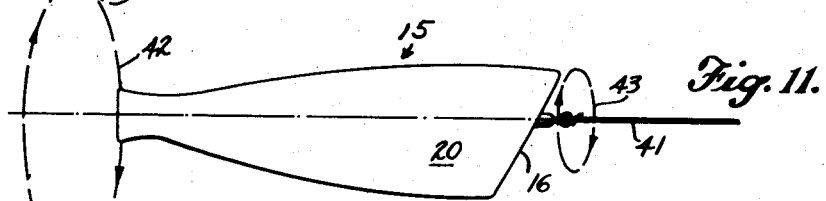
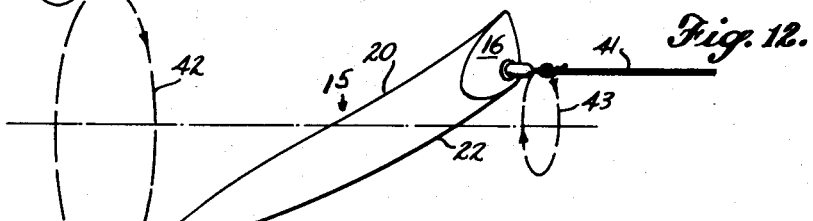
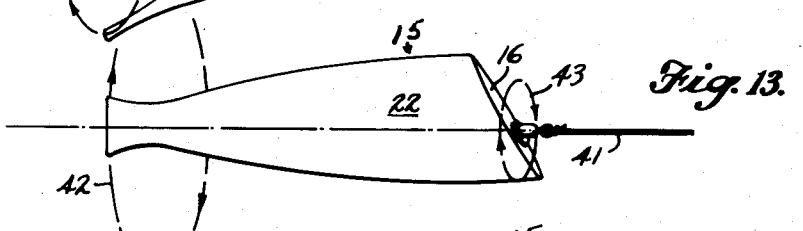
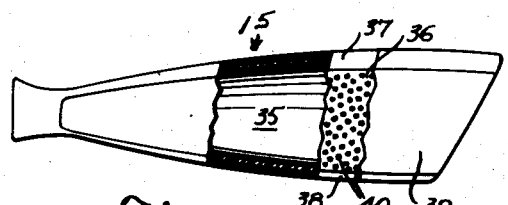
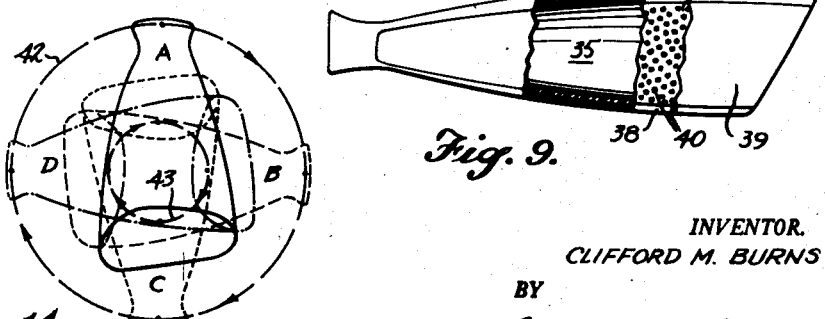

Patented June 23, 1953

2,642,695

UNITED STATES PATENT OFFICE 2,642,695

ARTIFICIAL FISHING LURE

Clifford M. Burns, Tacoma, Wash.

Application March 3, 1950, Serial No. 147,344

1 Claim. (Cl. 43—42.48)

My invention relates to artificial fishing lures and more particularly to that form of lures generally termed in the trade as a plug.

A primary purpose of my invention is to provide an artificial lure which will be particularly effective in many types of fishing and has such versatility of use that the lure is well adapted for use in those types of fishing known as "spinning" or "mooching" and "trolling."

In spinning, the fisherman generally fishes from a boat suitably located and relatively fixed, as by anchoring. During spinning relatively light tackle, as light test line, is employed and generally only sufficient weight is employed to position the lure at the desired level below the surface of the water. In spinning, the fisherman generally casts the lure and attached line to a distance away from the boat. Then the lure is allowed to settle to the bottom or the desired depth. Then the line is stripped in (pulled steadily or intermittently into the boat) and the line brought into the boat is suitably stowed away to prevent tangling, as coiling the same on the bottom of the boat. Whenever a fisherman is stripping in moving water and the current is sufficient to maintain an artificial lure at a desired level and impart the desired action to the lure, the fisherman may pull in or pay out sufficient line to bring the lure to a desired level and allow the lure to remain in such position awaiting a strike.

Generally considered mooching differs from spinning, in that in mooching the boat is not secured or anchored but is allowed to drift with the current and propulsion is provided to the boat only occasionally or intermittently, if at all. In trolling the lure is towed from a boat and the relative speed of the boat to the water (the speed of the water of course varies with the particular current involved) governs the action of the lure.

From the above it will be readily apparent that a lure which is useful and highly successful in spinning, mooching, and trolling must be a lure of high versatility and one that will obtain the desired action in relatively slow water or in relatively fast water, that is to say, whether the water moves relatively slow or fast as respects the lure attached to a line which in turn is held by a fisherman, who may be located on a fixed or moving object. Thus, it is an object of my invention to provide a lure which will have the desired action even though there is a minimum of relative motion between the water and the lure and at the same time one that will retain such desired action even though the relative motion between the lure and the water is relatively fast.

Heretofore plugs were primarily used in trolling and casting and limited success of the same obtained if they were used in spinning and mooching. Thus, generally it may be stated that plugs of the prior art which were designed to have a desired atcion in trolling and casting did not have sufficient versatility of use and did not provide a desired action if the plugs were used during spinning and mooching.

Also, in the prior art plugs generally were designed to provide a darting, wiggling, motion to simulate the action of an injured fish and particularly of the type which was the natural food of the fish desired to be caught. As distinguished from such prior art plugs, my fishing lure is designed to spin or revolve or turn about an axis or axes generally angular to the longitudinal axis of the lure.

Prior art plugs were generally designed to dart from side to side and maintain an even keel, i. e., not rotate. Apparently the only object was to simulate the action of live fish darting from side to side and this regardless of the general apparance of the plug. As distinguished from such prior art plugs, fishing lures of my invention are designed to visually simulate a live fish with light reflecting side portion areas (much like the natural food fish of the fish desired to be caught) and to attract fish not only by reason of its fish-like appearance but due to its flashing action obtained by its revolving action. While live fish in swimming generally do not revolve about axes generally angular to the longitudinal axis thereof, yet I have found that by providing such a revolving action of my lure bait I am able to increase the area from which the flashing of the lure bait may be seen. In connection with flashing it is to be remembered that live fish bait generally are small fish having a dark greenish top and bright light-reflecting sides, as silver sides. The flashing occurs from reflection of light from the silver sides of the fish bait. Apparently the phenomenal success of my lure bait depends to a substantial measure upon causing the flashing thereof to be visual from substantially all angles and not merely in the area at right angles to the longitudinal axis of the lure. Obviously with a lure which maintains an even keel and merely darts from side to side the area from which the flashing of the bait lure may be seen is very limited. On the other hand, the area in which the flashing may be seen from a revolving and twisting fish bait is substantially many times greater than that from which flashing may be seen from a fish bait which merely darts and weaves but maintains an even keel and does not rotate or revolve.

It is a further object of my invention to provide a fish plug bait wherein the body thereof is elliptical in section rather than round in section and thus increase the amount of light reflection which can be observed from a given direction at a given time. From such construction and from the revolving and twisting action of my plug, the same causes intermittent and intense light reflections which can be observed at greater distances and over larger areas and thus the possibilities of a fish to be attracted thereby is greatly augmented over any of the plugs of the prior art.

When fishing is good or a number of fish are being caught, generally there is an abundance of natural live fish which are the natural food of the fish being caught. If a lure simulates in all respects the live food which is available for the fish, of course the chances of a fish striking one particular lure to which a line is attached, as compared to striking natural live food present in abundance, are percentage wise very small. Thus, it is an object of my invention to provide a lure which does not completely simulate all actions of the natural live food but does simulate portions thereof and varies other portions to provide a composite appearance and action that is more attractive to the fish desired to be caught.

It is a further object of my invention to provide a lure having a front end portion which is cut at an angle crosswise of the body of the lure and angularly downwardly to the body of the lure and to secure such a lure to a line toward one side and substantially intermediate the length of such forward face of the lure.

It is a further object of my invention to provide a fish lure which pivots about a mid body portion thereof and at the same time the head and tail portions revolve in circles of different diameters.

It is a further object of my invention to provide a kink or twist in the body portion of the lure which cooperates with the forward face of the lure in providing the desired action to the lure.

It is a further object of my invention to provide a body-like portion to the lure which is not only very similar to the body portion of live bait but is very durable and susceptible to mass production.

It is a further object of my invention to provide a lure of a type and character so that sizes and dimensions are not too critical so that even if the lures are produced on a mass production scale that substantially uniform results obtain in the various specimens so produced.

It is a further object of my invention to provide metallic coated side walls to the lure to simulate the silver side wall appearance of natural bait and to so dispose and cover the same that said side walls will be natural in appearance and durable even though they are subjected to rough handling and are from time to time subjected to the tooth action of hooked fish.

It is a further object of my invention to provide means for securing the hooks to the lure of my invention and in such a manner that the action of the lure is not in any wise impaired by the drag of the hooks through the water but in fact the desired action of the lure is augmented thereby.

The above mentioned general objects of my invention together with others inherent in the same are attained by the devices illustrated in the accompanying drawings, throughout which like reference numerals indicate like parts:

Figure 1 is a top plan view of a fish lure embodying my invention;

Fig. 2 is a view in side elevation of the device shown in Fig. 1;

Fig. 3 is a bottom plan view of said device;

Fig. 4 is a front elevational view of the device shown in Fig. 1 and taken substantially in the direction of broken line 4—4 of Fig. 1;

Fig. 5 is an enlarged sectional view taken substantially on broken line 5—5 of Fig. 2;

Fig. 6 is an enlarged fragmentary sectional view taken substantially on broken line 6—6 of Fig. 4 and with the draft link employed between the fishing line and one set of fish hooks shown in full lines;

Fig. 7 is an enlarged plan view of one of the split washers employed in connection with this invention;

Fig. 8 is an enlarged fragmentary sectional view taken substantially on broken line 8—8 of Fig. 1 and showing the swivel, connecting between the lure and one set of fish hooks, in perspective;

Fig. 9 is a view, similar to Fig. 2, with parts broken away, showing a hollow modified device of my invention;

Fig. 10 is a top plan outline view of a fish lure of my invention connected with a fragment of a fishing line and showing by dash lines the paths of movement of the head and tail portions of the lure of my invention during use;

Fig. 11 is a view similar to Fig. 10 and with the lure turned 90° over Fig. 10;

Fig. 12 is a view similar to Fig. 10 and with the lure turned 90° over Fig. 11 so that the belly portion of the lure is foremost to the observer;

Fig. 13 is a view similar to Fig. 10 and with the lure turned 90° over Fig. 12 so that the back portion of the lure is down and the belly portion of the fish is up; and Fig. 14 is a composite diagrammatical view looking toward the head of the lure and showing positions that the head and tail portions will assume during a complete revolution.

Referring now to Figs. 1 to 8 of the drawings, the body portion of the lure is generally numbered 15 and the lure body is provided with a forward face portion 16. The lure body portion 15 comprises generally a forward body portion 17 and a rear body portion 18. The rear body portion 18 simulates generally the mid and tail portions of a bait fish. A bait fish, as used herein, refers to the natural food fish of the fish sought to be caught and my fish lure generally simulates such bait fish. The forward body portion 17 is connected with the said rear body portion 18 and angles or curves toward one side as respects said rear body portion, as best appears in the plan view, Fig. 1.

The forward face portion 16 is angularly disposed to a transverse plane passing normally or substantially at right angles to the general longitudinal axis of the lure body 15. The face portion 16, at its leading side edge portion 19, as appears in Fig. 1, forms an acute angle with one side 20 of the lure body. The face portion 16 at its trailing side edge portion 21 forms an obtuse angle with the opposite side 22 of the lure body. The face portion 16 not only angles sidewise as indicated but angles downwardly. Thus, the face portion 16 forms an acute angle with the back of the lure body 15 and forms an obtuse angle with the belly portion of the lure body 15 (see particularly Fig. 2 of the drawings).

With such angular position of the face portion 16 relative to the lure body 15, the lure body 15 tends to rise and move towards the right (toward the viewer and downwardly as respects Fig. 1 of the drawings) as the lure is pulled through water or there is relative motion between the lure and a body of water. As viewed in Fig. 1 of the drawings, 19 will be the leading side edge portion of the face portion 16 and 21 will be the trailing side edge portion of the face portion 16 and the lure will tend to move in water as indicated above. However, the angle of the face portion 16 may be reversed as to side portions 20 and 22 so that the angle between the face portion 16 and the side portion 20 will become an obtuse angle and the angle between the face portion 16 and the side portion 22 will become an acute angle and the lure will tend to move to the left instead of the right (upwardly as respects Fig. 1 of the drawings rather than downwardly). If such a change is made then curvature between the forward body portion 17 and the rear body portion 18 should be reversed (the forward body portion 17 should angle upwardly rather than downwardly as respects Fig. 1 of the drawings) as the angular position between the forward body portion 17 and the rear body portion 18 cooperates with the angular position of the forward face portion 16 in augmenting the motion of the lure in a given sidewise direction.

A draft link means, numbered generally 23, connects between the trailing side edge portion 21 of the face 16 and side portion 20 of the lure body 15 which connects with the leading side edge portion 19 of the face portion 16. Thus, the lure will be towed or pulled from its forward portion and toward the trailing side edge portion of the face portion 16 and this regardless of whether the face portion 16 is angularly disposed as indicated or is reversed as indicated above.

The draft link means 23 may comprise an elongated eye member 24 disposed within a recess 25 in the lure body 15. The recess 25 extends from the face 16 at the trailing side edge portion thereof to the side 20 of the lure body 15 which connects with the advancing end portion of the face 16. The elongated eye member 24 is connected to swivels 26 and 27 which may be of usual construction. It is preferable that the tackle parts or fittings or hardware be removable and that the same may be installed after completion of the lure body 15. One way of accomplishing this purpose is to provide split washers 28 (shown detached in Fig. 7) so that the draft link means 23, comprising swivels 26 and 27 and elongated eye member 24, may be installed in place and then split washers 28 may be laterally inserted in place and then split or opening 29 in the split washers 28 may be removed by squeezing the split washers together. The said draft link means 23 can be later removed, when desired, by opening and removing one of the split washers 28. By employing split washers, the draft link is not only subject to installation after completion of the lure body 15, but is readily removable when desired. The swivel portions of the swivels 26 and 27 operate externally of the lure body 15 and thus there is little danger of entanglement of the swivels and nonoperation thereof because of fouling. Also, the split washers 28 are of a larger diameter than the recess 25 and after insertion in place, prevent longitudinal movement of the draft link means 23 relative to recess 25.

The recess 25 extends angularly from the trailing side edge portion of face 16 and tailwardly (so that the recess will extend generally angularly downwardly in Figs. 1 and 6 of the drawings) and also extends angularly downwardly so that in the elevation view, Fig. 2, the forward swivel 26 is at a higher elevation than the trailing swivel 27. A suitable hook means, as a treble hook 30, is secured to the trailing swivel 27 and any suitable fishing line 41 (shown in Figs. 10 to 13 inclusive) is connected to the advancing swivel 26 and more particularly to the forward eye thereof. At the tailward portion of lure body 15, additional hook means are connected with rear body portion 18. This may be accomplished by providing a recess 31 (indicated by dotted lines in Fig. 3 of the drawings) and a swivel 32 is inserted in said recess 31. A pin 33 extends through the advancing eye of swivel 32 and thus secures the swivel 32 to the body portion 18. The trailing eye of the swivel 32 is connected to any suitable hook means, as a treble hook 34. By employing a swivel 32 to interconnect the treble hook 34 with the body portion 18, the treble hook 34 is free to swivel and assume desired positions relative to the lure body 15. Again the construction shown for connecting the treble hook 34 to the lure body 15 is such so that the lure body 15 may be completed and the swivel 32 and treble hook 34 may be installed or removed by insertion or removal of pin 33. Preferably an opening is provided in the lure body portion 18 so that pin 33 snugly fits and is frictionally held in place so as to prevent inadvertent displacement thereof.

The lure body 15 is formed of any suitable material, as wood, plastic, or the like. I have found that the lure of this invention is particularly adapted to be made of plastic material.

Referring also to Fig. 9 of the drawings, it will appear that the lure body 15 may have a recess 35 therein to provide for extreme lightness of weight and desired balance or the same may comprise a substantially solid body portion as is indicated in Figs. 1 to 8 of the drawings. The lure body 15 preferably has its sides coated with a light reflecting material, as metal foil pieces 36 (see particularly Fig. 6). These metal foil pieces 36 are preferably of a light silver color to simulate the silver sides often present on minnows, candle fish, herring, and other bait fish which are the natural live food of the fish desired to be caught. Silver sides are particularly suitable for light reflection and thus in "flashing" may be seen at considerable distances in the water and enlarge the area in which the lure may attract fish desired to be caught. Also, preferably, the back portion of the lure body 15 is suitably decorated to simulate the back portion of the bait fish being simulated. The back portion so referred to is numbered 37 and the extent thereof is best shown in Figs. 1 and 2 of the drawings. The belly portion 38 of the lure body 15 is also suitably decorated to simulate the belly portion of said bait fish and such belly portion 38 is best indicated in Figs. 2 and 3 of the drawings. A transparent plastic coating 39 is disposed over the entire body 15 of the lure to protect the decorated back 37, metal foil pieces 36, belly portion 38 of the lure, face portion 16, and recesses 25 and 31, from wear and abrasion and from being scarred, torn or otherwise mutilated by fish as they strike the lure.

Before applying the metal foil pieces 36 to the lure body 15, preferably the metal foil pieces 36 are provided with a plurality of perforations 40 (see Fig. 9) so that volatile liquids employed in adhering the metal foil pieces 36 in place can escape through such perforations and the drying period of the adhesive so employed is greatly diminished.

The general characteristics of the plastic coating 39 are that such plastics shall be relatively tough and wear-resistant, shall remain set at temperatures over those existing where fishing lures are employed, stored, or sold, and shall be relatively hard at such temperatures so as not to become softened and deformed by handling or by contact with objects. Also, the plastic coating 39 should be relatively clear or transparent so that the decorations on the back, sides and belly of the lure will be readily visible. Also, the plastic should be such so that a substantial coating, such as twenty-thousandths of an inch in thickness, may be provided and without requiring too many dippings or coatings to provide a layer of such thickness. One type of plastic which I have employed and which can be readily obtained on the market having the desired characteristics is sold under the trade name of "Tenite 2" gel lacquer. The above-mentioned product is sold under the trade name indicated and is manufactured by Eastman-Kodak Co. Such type of plastic may be heated to approximately 120° F., and in view of the solvents present as the same is sold, it will become sufficiently fluid so it can be applied to coat the lure body 15, after the same has been suitably decorated and after the metal foil pieces 36 have been positioned. The lure body 15 is dipped in said fluid plastic and two dippings have been found to provide a coating of approximately twenty-thousandths of an inch. The plastic coating so formed is readily applied, the coating is tough and wear-resistant, and the same remains rigid and solid at temperatures normally encountered during the handling, selling and using of the lure. The temperatures at which the plastic coating will remain rigid and solid are much higher than 120° as the solvents have been evaporated during curing of the plastic coating. Other types of plastics may be employed for the coating process and they may be either of the thermoset type or the thermoplastic type or they may be of the type containing volatile solvents which may be evaporated to leave a residue plastic coating on the lure body 15.

Referring now more particularly to Figs. 10 to 14 of the drawings, the action of lures embodying my invention is illustrated. In such figures, a fragment of the fishing line for towing the lure is indicated by 41. The lure is somewhat diagrammatically shown by the lure body 15. In Fig. 10, the lure body 15 is shown in top plan looking directly at the back of the lure body 15 and in Figs. 11, 12, and 13 it is shown in successive positions of the lure as the same revolves and at positions which the lure may assume at ninety degree intervals of turning movement. The motion of the forward end of the lure body 15 is indicated by the path of travel of a forward end of the swivel 23 about dash line circle 43 and the arrow on said circle indicates the direction of travel of the particular lure illustrated. The concurrent movement of the tail end of the lure is indicated by the dash line circle 42 and the arrow thereon. In the interest of better illustration, the circles, 42 and 43 are shown as ellipses in Figs. 10 to 13 inclusive and as circles in Fig. 14 of the drawings even though the lure is shown respectively in top plan, side elevation, bottom plan, and side elevation in Figs. 10 to 13 inclusive.

Fig. 12 is a view of the lure taken at approximately ninety degrees to its position in Fig. 11 of the drawings and looking directly at the belly of the lure. In said view the head end portion of the lure is angularly moved approximately ninety degrees about the circle 43 over the position shown in Fig. 11 and at the same time the tail portion has moved approximately ninety degrees about the larger circle 42. In Fig. 13 the lure body 15 has been again turned about ninety degrees and with the forward end portion of the lure following the path of circle 43 while the tail end portion of the lure is following the circle 42. It is to be noted that the lure body 15 not only revolves in different circular paths at its opposite ends but that the said ends are at diametrically opposed positions on the said circles and thus the lure simultaneously angularly moves about a center toward the head portion of the lure body. The various positions of the lure plotted in Figs. 10 to 13 of the drawings are also plotted in the composite end view, Fig. 14, and the various positions are indicated respectively by the letters A to D inclusive and to distinguish separate positions of the parts in the A to D respective positions full lines indicate A position, dash lines indicate B position, dot lines indicate C position, and dot-dash lines indicate D position.

By causing the lure body to revolve at its head and tail portions about circles of different diameters and at the same time angularly moving the lure, the flashing sides of the lure body provided by the metal foil pieces 36 are visible not only directly from all sides around the lure body 15 but over a wide angle as the lure is angularly moving as the tail follows circular path 42, and the head portion follows the smaller circular path 43 and at diametrically opposite positions thereon.

Instead of having both ends of the lure body follow movements about corresponding parts of two circles of the same or of different diameters so that the lure body would move in a cylindrical truncated conical path, I provide the head portion moving about a small circular path, the body portion 15 twisting or angularly moving about a fulcrum toward the head portion of the lure and at the same time the tail portion moving in a larger circular path. Thus the flashing of the lure is visible from substantially all directions for a portion of its movement and may attract fish over a relatively large area which probably is a contributing factor to the phenomenal success of this lure.

Thus, in a general way I have provided a fishing lure comprising a rear body portion 18 simulating generally the mid and tail portions of a bait fish; and a forward body portion 17 connected with said portion 18 and said portion 17 angles toward one side as respects said portion 18, such as to the right, as shown in the illustrations of this invention. As previously explained, it is to be expressly understood that said portion 17 may angle to the left instead of to the right if so desired. Next, I have provided a forward face portion 16 which forms an acute angle with one side of the lure body and an obtuse angle with the other side. If the portion 17 angles to the right as shown, then the juncture between the right side of the lure body and the forward face portion 16 will be the leading end portion of the body portion 17. In the event that the body portion 17 angles to the left then the left side of the face 16 or the juncture between the left side of the lure body and the face 16 will be the leading end portion of the body portion 17.

Next, I have provided a fishing line securing means, as swivel 26, connected with the trailing side portion of the forward face portion 16. Said swivel means 26 and associated parts comprise the opening 25 which extends from the trailing edge portion of the face portion 16, or the left side thereof, angularly rearwardly and downwardly and terminating in the opposite side of the lure body portion 17 or the right side thereof. The draft link means comprises the elongated eye member 24 carrying swivels 26 and 27 and which draft link means is held in place by split washers 28. Thus the draft link means 23 can be installed after the lure body is completed and said draft link means can be readily replaced when desired.

I have illustrated treble hooks 30 and 34 as fish hook means disposed on the sides of the lure body, the same being connected respectively to swivels 27 and 32. When the treble hooks 30 and 34 are connected on opposite sides of the lure body, as shown, they tend to balance each other in weight. However, if they are connected to the same side e. g., treble hook 34 extending from the right side of the lure body instead of the left, then the hooks would tend to dampen the action which may be desired in some instances of proportion, weight, curvature of parts, and the like. On the other hand, if both hooks were disposed on the left side of the lure body and the parts would otherwise remain the same as indicated in the drawings, then the weight of the hooks would tend to augment the action of the lure.

Further, I have provided a fish lure comprising a body portion 15 simulating generally a bait fish; back and belly decorations 37 and 38 which simulate back and belly portions of the bait fish; metal foil sides 36 which simulate the sides of the bait fish; and a transparent plastic coating 39 covering said lure body portions to permit ready visibility of the parts under the plastic coating and to protect the same against abrasion and wear.

Obviously, changes may be made in the forms, dimensions, and the arrangements of the parts of my invention, the above setting forth only preferred forms of embodiment thereof.

I claim:

A fishing lure comprising a body of greater length than width having its greater width at the forward end and having substantially the appearance of a fish, said body from a point substantially at the center thereof in its length to the rear end of the tail being substantially symmetrical and with a straight longitudinal axis, the remainder of the body in advance of that point having its upper surface convex longitudinally and a side surface concave longitudinally and its peripheral surface being substantially ovoidal in cross section, the upper portion of the cross section having a radius of curvature greater than the radius of curvature of the lower portion thereof, said body having a front face, the periphal edge of which lies in a single plane and is at an acute angle to the longitudinal axis of the remainder portion of the body, said face inclining rearwardly from the upper end thereof to the lower end thereof and from one side thereof to an opposite side thereof, said body having securing means for a line, said securing means being attached to the front face thereof and offset with respect to the center of said face and adjacent the rear side edge of the front face, said body having a fishhook attached thereto on a side thereof and to the rear of said securing means.

CLIFFORD M. BURNS.

References Cited in the file of this patent

UNITED STATES PATENTS

| Number | Name | Date |
|---|---|---|
| Re. 18,390 | Welch | Mar. 22, 1932 |
| 1,086,256 | Wilber et al. | Feb. 3, 1914 |
| 1,323,458 | Dills | Dec. 2, 1919 |
| 1,472,638 | Dickman | Oct. 30, 1923 |
| 1,745,006 | Chapleau | Jan. 28, 1930 |
| 1,752,706 | Sobecki | Apr. 1, 1930 |
| 2,102,492 | Stolley | Dec. 14, 1937 |
| 2,155,294 | Barnett | Apr. 18, 1939 |
| 2,387,255 | Godlewski | Oct. 23, 1945 |
| 2,505,922 | Stranak | May 2, 1950 |
| 2,516,468 | Klein | July 25, 1950 |
| 2,536,553 | La Fleur | Jan. 2, 1951 |
| 2,538,484 | Tenn | Jan. 16, 1951 |